US006512425B2

(12) United States Patent
Morita et al.

(10) Patent No.: US 6,512,425 B2
(45) **Date of Patent: *Jan. 28, 2003**

(54) ELECTRIC NOISE ABSORBER

(75) Inventors: Katsuyuki Morita, Nagoya (JP); Hideharu Kawai, Nagoya (JP)

(73) Assignee: Kitagawa Industries Co., Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/946,777

(22) Filed: Sep. 5, 2001

(65) Prior Publication Data

US 2002/0024402 A1 Feb. 28, 2002

Related U.S. Application Data

(63) Continuation-in-part of application No. 09/390,175, filed on Sep. 7, 1999, now Pat. No. 6,285,265.

(30) Foreign Application Priority Data

Sep. 10, 1998 (JP) .......................................... 10-256804

(51) Int. Cl.[7] .................................................. H04B 3/28

(52) U.S. Cl. ......................... 333/12; 333/181; 324/127; 336/65; 336/92; 336/175

(58) Field of Search ............................ 324/127; 333/12, 333/181; 336/65, 52, 175

(56) References Cited

U.S. PATENT DOCUMENTS 4,882,561 A * 11/1989 Fujioka ...................... 324/127
4,885,559 A * 12/1989 Nakano ...................... 324/127
4,964,013 A * 10/1990 Kitagawa .................... 307/105
4,972,167 A * 11/1990 Fujioka ....................... 336/92
5,287,074 A * 2/1994 Meguro et al. ............... 333/12
5,291,172 A * 3/1994 Ito et al. ...................... 324/127
5,343,184 A * 8/1994 Matsui et al. ............... 324/127
5,355,109 A * 10/1994 Yamazaki ................. 174/65 R
5,703,557 A * 12/1997 Osada et al. .................. 336/92
5,764,125 A * 6/1998 May ........................... 324/127
5,900,796 A * 5/1999 Parker ......................... 336/92
5,920,250 A * 7/1999 Watanabe et al. ............. 333/12
5,942,964 A * 8/1999 Takeuchi ..................... 336/92
6,072,125 A * 6/2000 Takeuchi ................ 174/138 F
6,078,241 A * 6/2000 Watanabe et al. ............. 336/92
6,285,265 B1 * 9/2001 Morita et al. ................. 333/12

* cited by examiner

*Primary Examiner*—Michael Tokar
*Assistant Examiner*—Khai Nguyen
(74) *Attorney, Agent, or Firm*—Davis & Bujold, P.L.L.C.

(57) ABSTRACT

An electric noise absorber for preventing looseness of magnetic body parts in a closed housing, without increasing the number of parts or decreasing the strength of the housing. The housing comprises a pair of case halves which house ferrite core halves, respectively, and are hinged to each other. The bottom wall of each case half is formed with a curved shape convex toward the space housing the ferrite core half. When the case halves are closed with the ferrite cores therein, the ferrite cores press each other toward respective bottom walls and resiliently deform the walls. The resilience of the deformed bottom walls urges abutting surfaces of the ferrite cores into close contact.

10 Claims, 6 Drawing Sheets

ELECTRIC NOISE ABSORBER

This is a continuation-in-part application of U.S. patent application Ser. No. 09/390,175 filed Sep. 7, 1999, now U.S. Pat. No. 6,285,265.

BACKGROUND OF THE INVENTION (i) Field of the Invention

The present invention relates to an electric noise absorber which is attached around an electric wire of electronic apparatus to absorb electric noise flowing through the electric wire.

(ii) Description of the Related Art

In a conventional art electric noise absorber of this kind, two magnetic body parts, which are configured to collectively form a tubular magnetic body for encompassing the circumference of an electric wire, are housed in a plastic holding case.

The electric noise absorber is attached around the electric wire so as to grip the electric wire from both sides, so that the magnetic body parts, which are held in a tubular shape with their abutting surfaces closely contacting each other and absorb electric noises flowing through the electric wire.

In such an electric noise absorber comprising abutting magnetic body parts, if the contact between the magnetic body parts is loose when the holding case is closed, the magnetic body parts are unsteady and may be broken by striking each other. Therefore, measures are taken in order to make the magnetic body parts press each other and ensure close contact between the abutting surfaces thereof, thereby preventing unsteadiness of the magnetic body parts. One such measure is to provide tongue-like spring members projecting from the inner surface of the side walls of the holding case toward the housing space, and another is to insert curved leaf springs between the holding case and the magnetic body parts.

When spring members are used, however, not only is the strength of the holding case decreased, because the spring members are formed by notching the outer walls of the case, but also since the spring members pressed by the magnetic body parts are exposed to continuous stress, the spring members are apt to be permanently deformed due to stress-creep when left in that state for a long time and gradually lose pressure against the magnetic body parts.

In the case where leaf springs are used, the manufacturing and assembly operation requires more tie and labor due to the increase of the number of parts.

SUMMARY OF THE INVENTION

Wherefore, an object of the present invention is to provide an electric noise absorber which can prevent unsteadiness of the magnetic body parts when its holding case is closed, without increasing the number of parts or decreasing the strength of the holding case.

To accomplish the above object, the present invention discloses an electric noise absorber for attachment around an electric wire of electronic apparatus to absorb electric noises flowing through the electric wire. The electric noise absorber comprises: a pair of magnetic body parts together defining a hollow cylinder to encompass the circumference of the electric wire; and a holding case, including case halves for housing the magnetic body parts, respectively, and connecting members for releasably connecting the case halves. The holding case holds the magnetic body parts in the shape of a hollow cylinder when the case halves are in a closed position. Circumferential walls of the case halves are formed such that those walls are deformed by being pressed by the magnetic body parts when the holding case is closed, so that the resilience of the deformed circumferential walls to return to the former shape causes force to urge the abutting surfaces of the magnetic body parts into close contact with each other.

As described above, with the electric noise absorber according to the invention, unsteadiness of the magnetic body parts in the holding case is prevented.

Moreover, the electric noise absorber according to the invention can prevent reduction of the strength of the holding case or increase of time and labor for manufacturing and assembly operation because it is not necessary to notch the case halves or to add any other parts.

A specific shape of the circumferential walls of the case halves having the aforementioned effects and advantages is, for example, a curved shape convex toward the housing space for housing the magnetic body parts. In this case, the magnetic body parts housed in the housing space are formed such that, when the magnetic body parts contact with the most protruding parts of the circumferential walls, the abutting surfaces of the magnetic body parts extend out of the edge surfaces (hereinafter referred to as "open mouth surfaces") of the case halves. When the holding case is closed, the extending portions of the magnetic body parts are pressed into the case halves, which results in deformation of the curved circumferential walls outward. As a result, the resilience of the circumferential walls to return to the former shape causes force to urge the abutting surfaces of the magnetic body parts into close contact with each other.

Such resilience can also be obtained in other ways, as long as the circumferential walls can be deformed by contacting the magnetic body parts when the holding case is closed.

For example, the inner surface of the circumferential walls of the case halves may be provided at the axial center thereof with protrusions which protrude toward the housing space for housing the magnetic body parts. Also in this case, as long as the magnetic body parts are formed such that the abutting surfaces of the magnetic body parts in contact with the protrusions extend from the "open mouth surface" of the case halves when the magnetic body parts are inserted in the case halves, the same effects and advantages as aforementioned can be obtained.

BRIEF DESCRIPTION OF THE DRAWINGS

The invention will now be described, by way of example, with reference to the accompanying drawings, in which.

DETAILED DESCRIPTION OF PREFERRED EMBODIMENTS

Figure 1:
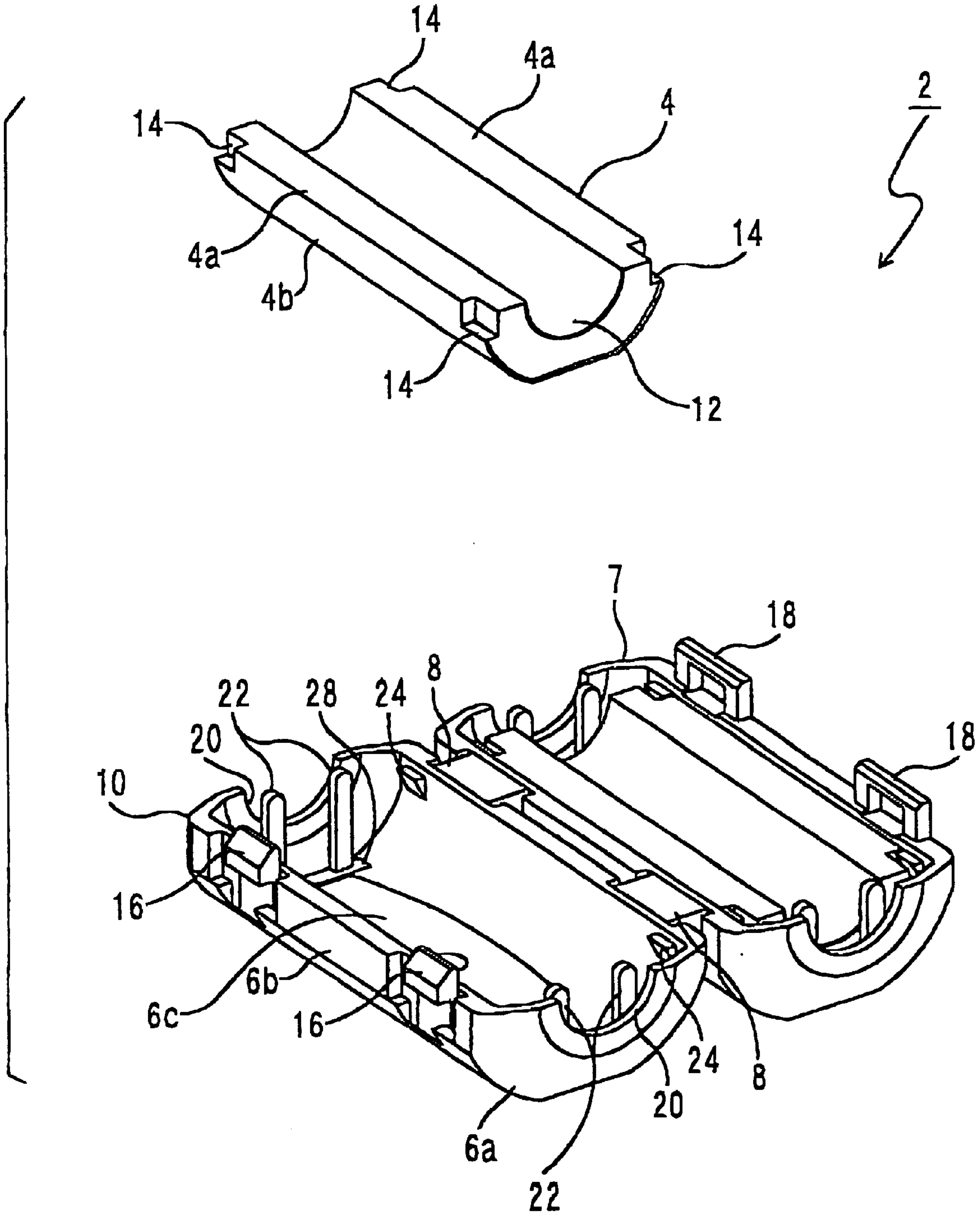
FIG. 1 is a perspective view showing the entire structure of an electric noise absorber according to a first embodiment of the present invention.
Figure 2A:
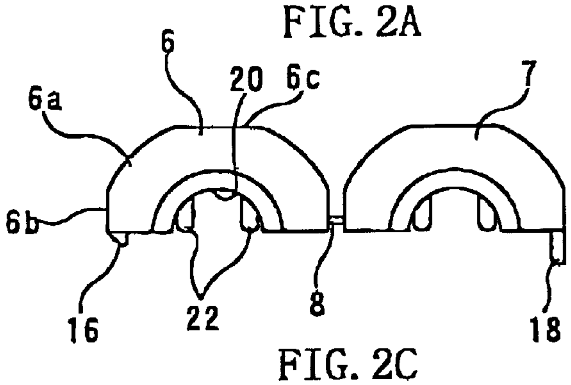
FIG. 2A is a plan view.
Figure 2B:
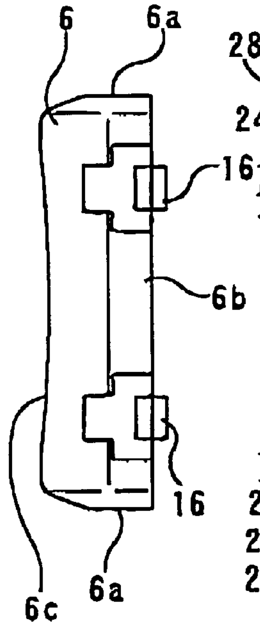
FIG. 2B is a left side view.
Figure 2C:
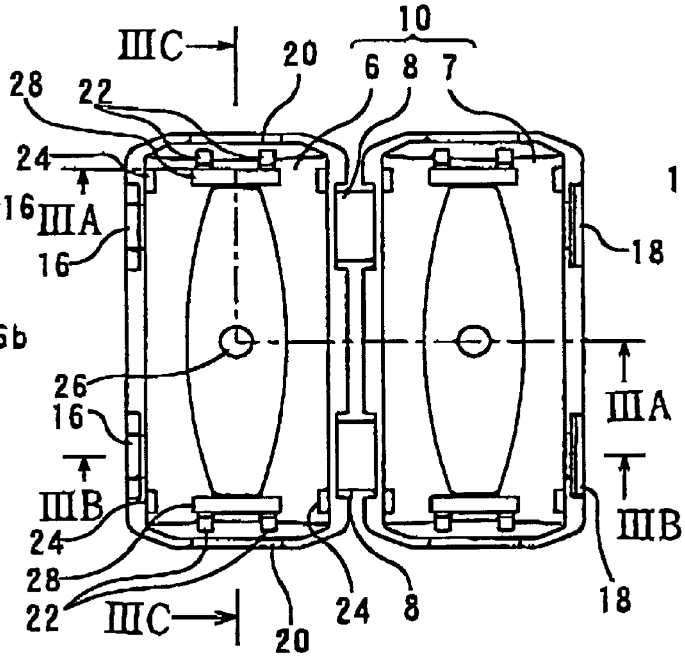
FIG. 2C is a front view.
Figure 2D:
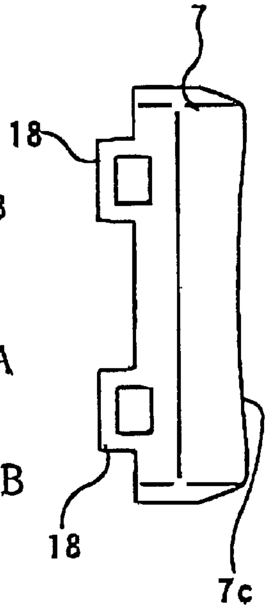
FIG. 2D is a right side view.
Figure 2E:
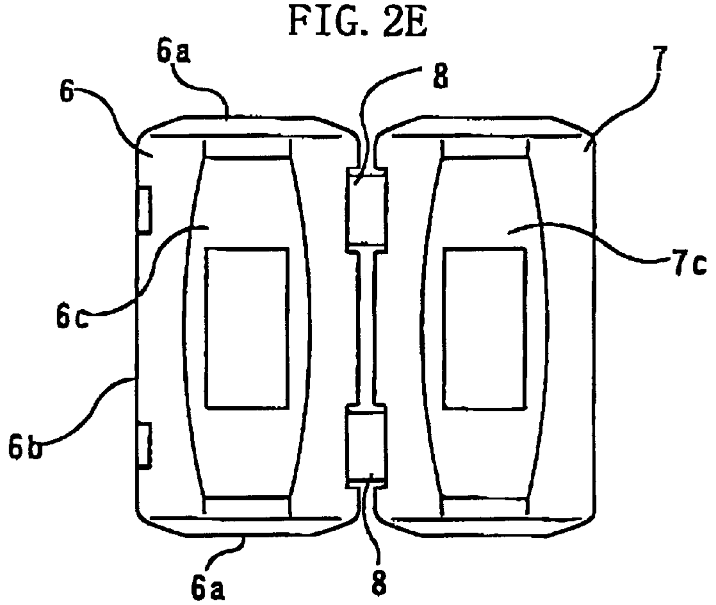
FIG. 2E is a rear view, all showing the detailed structure of the electric noise absorber according to FIG. 1.
Figure 3A:
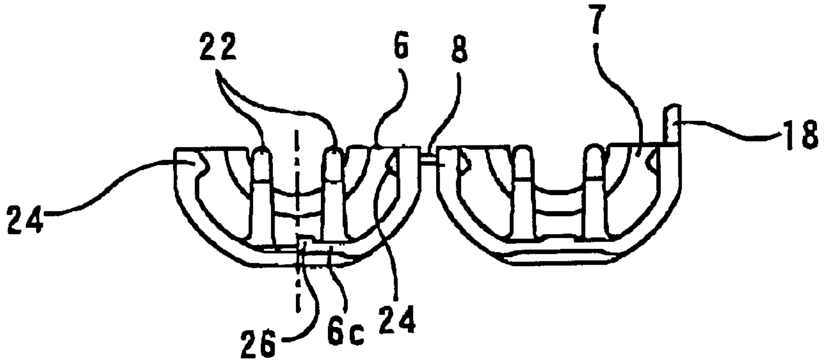
FIGS. 3A through 3C are sectional views taken along respective lines IIIA—IIIA, IIIB—IIIB, and IIIC—IIIC of FIG. 20.
Figure 3B:
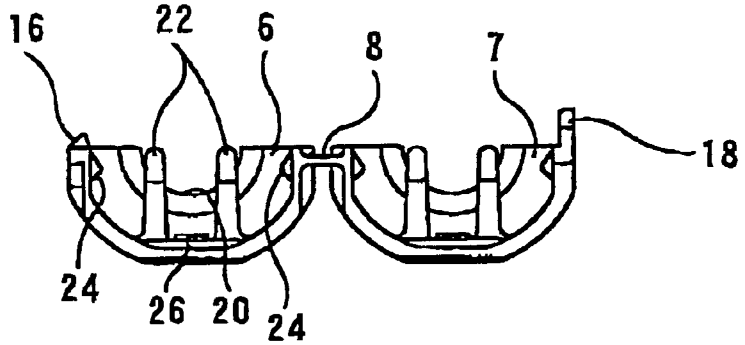
Figure 3C:
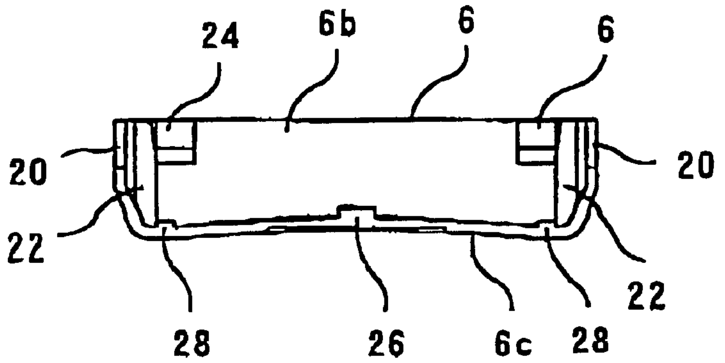

As shown in FIGS. 1 through 3, an electric noise absorber 2 comprises: a pair of ferrite cores 4, 5 which have a shape as if formed by longitudinally dividing a tubular body, having a generally octagonal outer surface and a circular inner periphery, into two identical pieces on a plane passing through the center of a pair of opposing sides of the octagon; and a holding case 10 comprising a pair of case halves 6, 7 which, in use, house the ferrite cores 4, 5, respectively, and are hinged to each other by a pair of hinges 8.

Since the ferrite cores 4, 5 have exactly the same shape, only the ferrite core 4 will be described hereinafter.

At the center of the ferrite core 4 is provided an electric wire housing channel 12, which has a semicircular cross section and is located between a pair of surfaces 4*a*. At both axial ends of the ferrite core 4, a pair of recesses 14 are formed in each surface 4*a* and the neighboring outer surface 4*b*. The above-mentioned ferrite core 4 corresponds to the magnetic body part in the present invention.

In the holding case 10, two detents 16 are formed on the case half 6 and two locking latches 18 to engage with the detents 16 are formed on the case half 7, so that the case halves 6, 7 are held in a closed position when closed. Since the case half 6 and the case half 7 are the same except the above detents 16 and locking latches 18, only the case half 6 will be described hereinafter.

The case half 6 is provided, at both axial ends, with a pair of opposing end walls 6*a* having semi-circular apertures 20 respectively, and near each aperture 20 inside the case half 6, with electric wire supports 22 composed of a pair of upstanding projections arranged closer together than the maximum width of the aperture 20.

When the case halves 6, 7 are closed, the apertures 20 in cooperation with the electric wire housing channels 12 of the ferrite cores 4, 5 housed in the case halves 6, 7 together define a substantially cylindrical electric wire housing opening. The electric wire supports 22 captively hold an electric wire inserted in the electric wire inserting channels 12.

On the inner surfaces of a pair of side walls 6*b* facing the outer surface 4*b* of the ferrite core 4 housed in the case half 6 are provided projections 24 which engage the recesses 14 formed in the ferrite core 4, thereby preventing the ferrite core 4 from falling out of the ease half 6.

A bottom wall 6*c* of the case half 6 is configured to have a curved shape such that the center part of the bottom wall 6*c* protrudes the most toward the housing space for the ferrite core 4. Further, on its protruding part is provided a cylindrical projection 26, and at both axial ends of the bottom wall 6*c* are provided elongate projections 28 along the opposing end walls 6*a*, respectively.

Figure 4A:
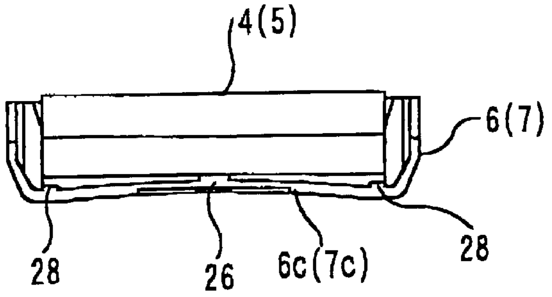
FIGS. 4A through 4D are explanatory views showing the state of the electric noise absorber of FIG. 1 in use.
Figure 4C:
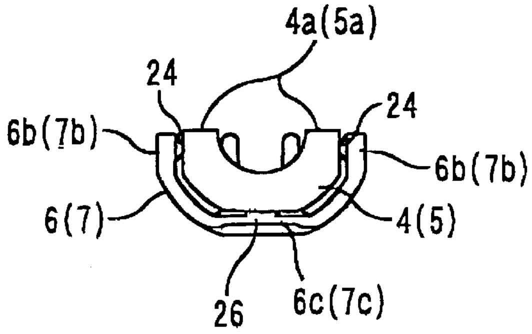

With the aforementioned arrangement, when the ferrite core 4 is housed in the case half 6 and merely contacts the projection 26 with the surfaces 4*a* of the ferrite core 4 protruding above the open mouth surfaces of the case half 6 (FIGS. 4A and 4C). When the ferrite core 4 is pushed into the case half 6 until the abutting surface 4*a* of the ferrite core 4 reaches the same level as the open mouth surface of the case half 6, the ferrite core 4 comes into contact with projections 28.

The holding case 10 is integrally molded from a synthetic resin and, therefore, each of the case halves 6, 7 has a desired resilience.

When the ferrite cores 4,5 are mounted in the case halves 6, 7 respectively, the projections 24 of each of the case halves 6, 7 engage with the recesses 14, and thus, the ferrite cores 4, 5 are retained in the case halves 6,7.

In this situation, as shown in FIG. 4A, the ferrite cores 4, 5, the engaging recesses 14 of which are engaged with the engaging projections 24, are retained in contact with the projections 26, and the abutting surfaces 4*a*, 5*a* protrude above the open mouth surface of the case halves 6,7.

Figure 4B:
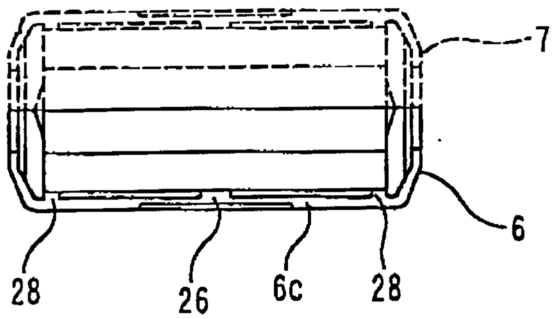
Figure 4D:
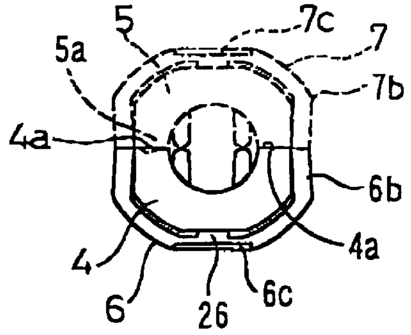

After an electric wire is placed in the electric wire channel 12 and pinched by the electric wire support 22, the case halves 6,7 are closed. Then, the abutting surfaces 4*a*, 5*a* of the ferrite cores 4, 5 held in the case halves 6, 7 contact with each other and press each other toward the bottom walls 6*c*, 7*c*. As a result, as shown in FIG. 4B, the bottom walls 6*c*,7*c* curved convexly toward the inside elastically deform toward the outside and the case halves 6, 7, as a whole, deform elastically such that the side walls 6*b*, 7*b* can grip the ferrite cores 4, 5.

Further, when the locking latches 18 are engaged with the detents 16 to hold the case halves 6, 7 in a closed position, the resilience of deformed bottom walls 6*c*, 7*c* urges the abutting surfaces 4*a*, 5*a* of the ferrite cores 4, 5 into close contact with each other. The ferrite cores 4, 5 are no longer loose in the case halves 6, 7 because they contact also with the elongate projections 28, and moreover are firmly gripped by the side walls 6*b*, 7*b*.

In the electric noise absorber according to the embodiment, as described above, force to urge the abutting surfaces 4*a*, 5*a* of the ferrite cores 4, 5 into close contact with each other is acquired by forming the bottom walls 6*c*, 7*c* to have a curved shape (arcuate longitudinal shape) convex toward the space housing the ferrite cores 4, 5. Therefore, it is not necessary to notch the bottom walls 6*c*, 7*c* or to add any other parts in order to produce such force. That is, it is possible to prevent unsteadiness of the ferrite cores 4, 5 in the holding case 10, without decreasing the strength of the case halves 6*c*, 7*c* or increasing time and labor for manufacturing and assembly operation.

Further, it is possible to prevent unsteadiness of the ferrite cores 4, 5 in the direction along the abutting surfaces 4*a*, 5*a* because the case halves 6, 7, as a whole, deform elastically such that the side walls 6*b*, 7*b* can grip the ferrite cores 4, 5 resulting from the elastic deformation of the bottom walls 6*c*, 7*c*.

Moreover, close contact between the abutting surfaces 4*a*, 5*a* of the ferrite cores 4, 5 can be improved because the resilience of the deformed bottom walls 6*c*, 7*c* to return to the former shape is designed to be strong by restricting the deformation of the bottom walls 6*c*, 7*c* at the both axial ends by the elongate projections 28.

Figure 5A:
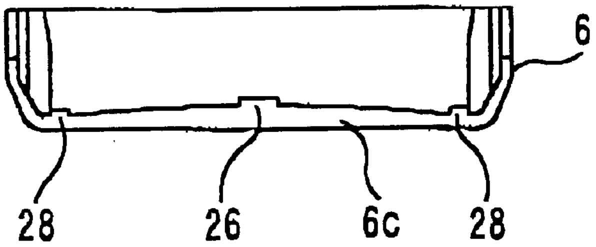
FIGS. 5A through 5C are explanatory views showing other embodiments of the present invention.

Although a preferred embodiment of the invention has been described, the invention is not restricted to the above embodiment and various modifications are possible, without departing from the scope and spirit of the invention as disclosed in the accompanying claims. For example, the bottom walls 6*c*, 7*c*, which have an approximately uniform thickness and a curved shape in the above embodiment, may be formed such that the center parts of the bottom walls 6*c*, 7*c* are thicker and only the inner surfaces thereof are curved convexly toward the spaces for housing the magnetic body parts as shown in FIG. 5A.

Alternatively, each of the bottom walls 6*c*, 7*c* may be formed without a curved shape and merely with the projection 26 and the elongate projections 28. In this case, the elongate projections 28 must be formed to have a smaller elevation than the projection 26, or may be omitted.

Figure 5B:
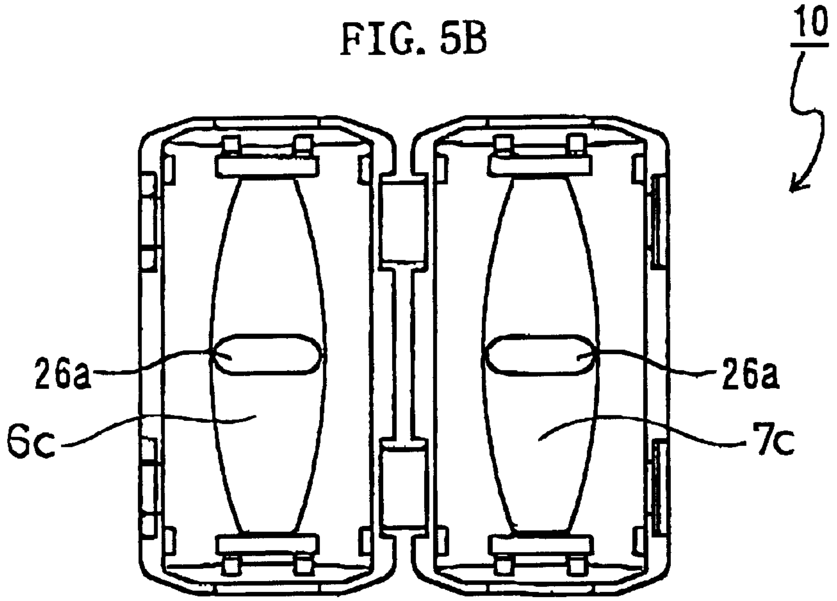

Further, although the most protruding part of each of the curved bottom walls 6*c*, 7*c* is provided with the cylindrical projection 26 in the aforementioned embodiment, the above part may be provided with a laterally extending projection 26*a* as shown in FIG. 5B. That is, the shape of the projection is not restricted to what is shown in the mentioned embodiment.

Figure 5C:
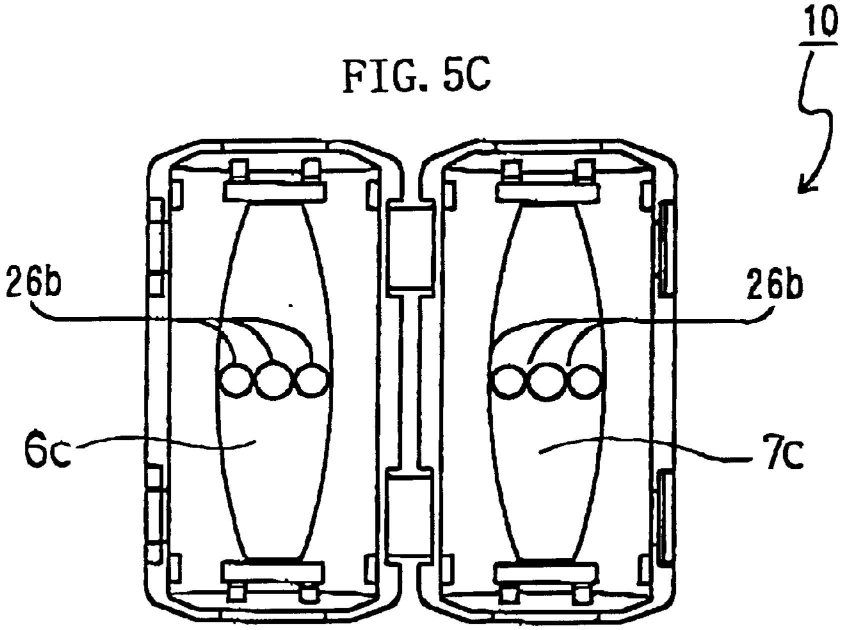

As shown in FIG. 5C, each of the bottom walls 6C, 7C may be provided with a projection 26*b* comprising a plurality of projections. The number and arrangement of the projections is not restricted to those in this embodiment.

Furthermore, the case halves 6, 7, which are formed integrally through the hinges 8 in the embodiment, may be formed separately by, for example, replacing the hinges 8 with additional detents 16 and locking latches 18.

Figure 6A:
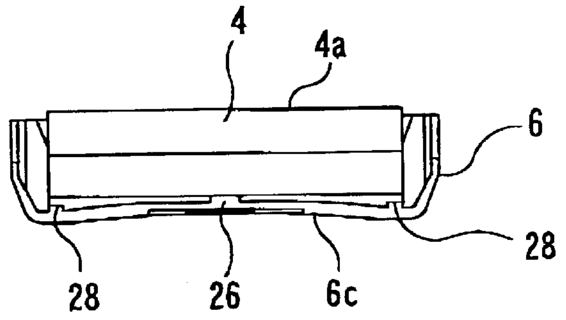
FIGS. 6A through 6D are explanatory views showing other embodiments of the present invention.
Figure 6B:
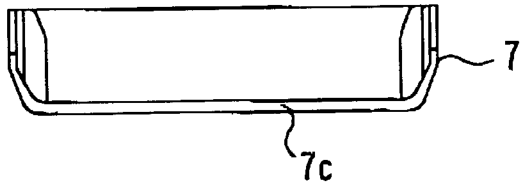

While, in the above embodiments, each of the bottom walls 6*c* and 7*c* is formed to have a curved shape which is the most convex in the center portion of the bottom wall toward the space for housing the ferrite cores 4, 5, it may be possible to form only one bottom wall 6*c* having such a curved shape with a convexly curved surface and the other bottom wall 7*c* not having such a curved shape, as shown in FIGS. 6A and 6B.

Even in this case, if the abutting surface 4*a* protrudes above the open mouth surface of the case half 6, as shown in FIG. 6A, when the ferrite core 4 is inserted into the case half 6, the ferrite cores 4, 5 are biased in the direction that the abutting surfaces 4*a*, 5*a* come into close contact with each other when the case halves are closed.

In other words, when the case halves 6, 7 are retained in the closed position after an electric wire is placed in the electric wire housing channel 12 and pinched by the electric wire support 22, the ferrite cores 4, 5 receive a biasing force to urge the abutting surfaces 4*a*, 5*a* into close contact with each other due to resilience of the deformed bottom wall 6*c* to return to the former shape, in the same manner as in the above described embodiment. Thus, unsteadiness of the ferrite cores 4, 5 in the holding case 10 can be prevented as in the above embodiments.

Figure 6C:
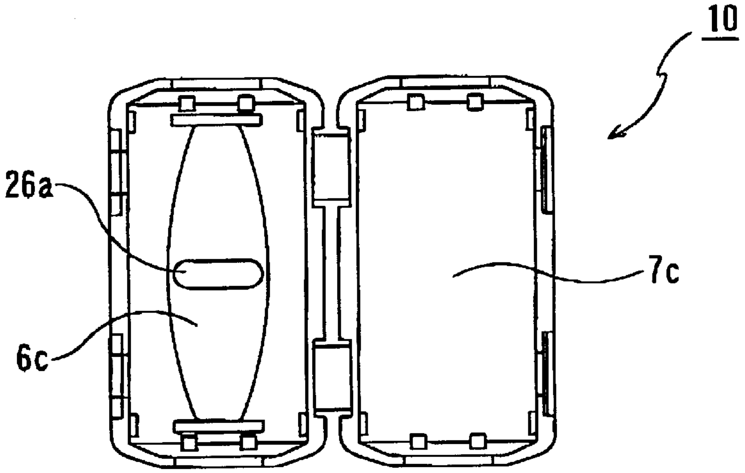
Figure 6D:
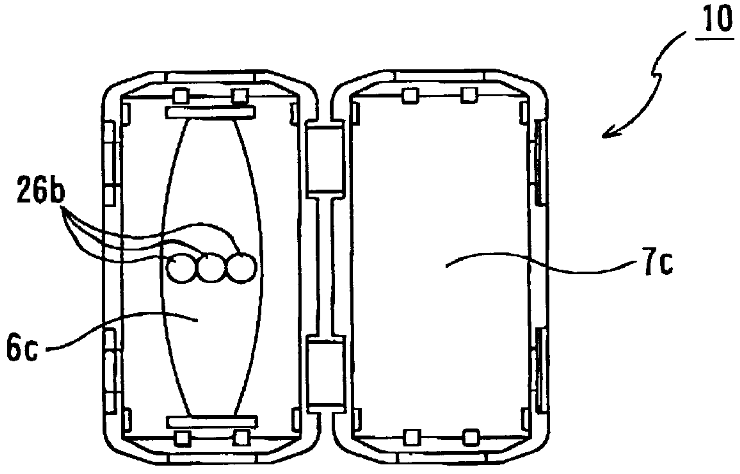

Also in the case where only one bottom wall 6*c* has a curved shape with a convexly curved surface protruding toward the housing space for housing the ferrite cores 4, 5, and the other bottom wall 7*c* does not have such a curved shape, either the shape or the number of projections 26 provided on the bottom wall 6*c* is not restricted to a specific shape or number. For example, a laterally extending projection 26*a* may be employed, as shown in FIG. 6C, while a projection 26*b* comprising a plurality of projections may also be employed as shown in FIG. 6D. Moreover, the projection 26 and the elongate projections 28 as above may be omitted.

Even in such a case with only one bottom wall 6*c* having a curved shape and the other bottom wall 7*c* not having a curved shape, the bottom wall 6*c* may be formed such that the center portion of the bottom wall 6*c* is thicker and only the inner surface thereof is curved convexly toward the housing space of the holding case 10 for housing the ferrite cores 4, 5 as in the above embodiment shown in FIG. 5A.

What is claimed is:

1. An electric noise absorber for encompassing a circumference of an electric wire to absorb electric noise flowing through the electric wire, the electric noise absorber comprising:

a pair of magnetic body parts, when mated together, defining a hollow cylinder for encompassing the circumference of the electric wire; and a housing having two mating case halves, and each of the case halves housing one of the pair of magnetic body parts, and each case half having connecting members for retaining the case halves in a closed position in which the pair of magnetic body parts define the hollow cylinder;

at least one of the case halves having deformable circumferential walls, and the deformable circumferential walls being at least partially deformed by the magnetic body parts when the housing is in the closed position; and the deformable circumferential walls having at least partially a convexly curved surface protruding toward the housing space for housing the magnetic body parts when the housing is in the closed position.

2. The electric noise absorber of claim 1, wherein a projection extends from the deformable circumferential walls and protrudes toward the housing space for housing the magnetic body parts when the housing is in the closed position.

3. The electric noise absorber of claim 1, wherein the convexly curved surface extends longitudinally along a length of the hollow cylinder.

4. The electric noise absorber of claim 3, wherein a projection extends from the deformable circumferential walls and protrudes toward the housing space for housing the magnetic body parts when the housing is in the closed position.

5. An electric noise absorber for encompassing a circumference of an electric wire to absorb electric noise flowing through the electric wire, the electric noise absorber comprising:

a pair of magnetic body parts, when mated together, defining a hollow cylinder for encompassing the circumference of the electric wire;

a housing having two mating case halves which in a closed position define an interior housing space, each of the case halves supporting one of the pair of magnetic body parts, and each case half having connecting members for retaining the case halves in the closed position;

at least one of the case halves being defined by a convexly curved deformable circumferential wall having a center portion extending radially into the interior housing space and being in contact with the respective magnetic body part; and wherein the circumferential wall is at least partially deformed by the magnetic body parts when the housing is in the closed position to bias the pair of magnetic body parts into abutting cylindrical relationship defining the hollow cylinder.

6. The electric noise absorber of claim 5 wherein the center portion of the convexly curved deformable circumferential wall has a smaller center radius with respect to the hollow cylinder than radii defining opposing end portions of the wall.

7. The electric noise absorber of claim 6, wherein an outer surface radius of the magnetic body parts when biased into abutting cylindrical relationship is greater than a radius of the center portion of the deformable circumferential wall so that in the closed position the center portion of the wall is deformed outwardly from the interior housing space.

8. The electric noise absorber of claim 7, wherein a projection is formed on the center portion of the deformable circumferential walls and protrudes radially into the interior housing space to contact the magnetic body parts when the housing is in the closed position.

9. The electric noise absorber of claim 5, wherein the convexly curved deformable circumferential wall extends longitudinally along a length of that at least one case half relative to the hollow cylinder.

10. An electric noise absorber for encompassing a circumference of an electric wire to absorb electric noise flowing through the electric wire, the electric noise absorber comprising:

a pair of magnetic body parts, when mated together, defining a hollow cylinder for encompassing the circumference of the electric wire; and a housing having two mating case halves which in a closed position define an interior housing space, each of the case halves supporting one of the pair of magnetic body parts, and each case half having connecting members for retaining the case halves in the closed position;

at least one of the case halves having wall supporting a center projection extending radially into the interior housing space farther than opposing end support portions of the wall for supporting the respective magnetic body part; and wherein the wall is at least partially deformed by the magnetic body part pushing the radially extending center projection radially outward relative to the opposing end support portions of the case half when the housing is in the closed position to bias the pair of magnetic body parts into abutting cylindrical relationship defining the hollow cylinder.

* * * * *

UNITED STATES PATENT AND TRADEMARK OFFICE

CERTIFICATE OF CORRECTION

PATENT NO. : 6,512,425 B2 
DATED : January 28, 2003
INVENTOR(S) : Katsuyuki Morita and Hideharu Kawai It is certified that error appears in the above-identified patent and that said Letters Patent is hereby corrected as shown below:

<u>Title page,</u>
Item [30], delete "[30] Foreign Application Priority Data,
Sep. 10, 1998 (JP)................................ 10-256804"
Item [63], delete "Continuation-in-part of application No. 09/390,175, filed on Sep. 7, 1999, now Pat. No. 6,285,265".

<u>Column 1,</u>
Lines 3-5, delete "This is a continuation-in-part application of U.S. patent application Ser. No. 09/390,175 filed Sep. 7, 1999, now U.S. Pat. No. 6,285,265"

Signed and Sealed this

Twenty-eighth Day of October, 2003

JAMES E. ROGAN
*Director of the United States Patent and Trademark Office*